Oct. 2, 1951 W. A. METHERELL 2,569,641
TRAILER HOUSE
Filed Dec. 27, 1945 3 Sheets-Sheet 1
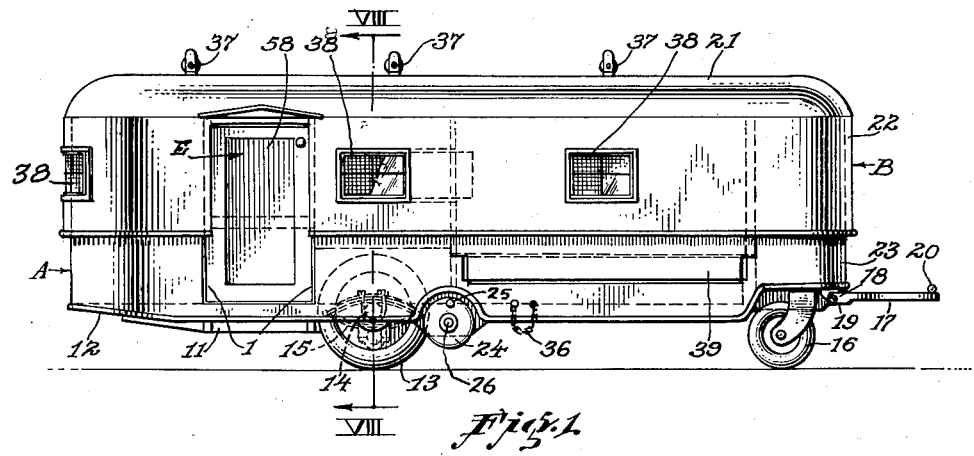
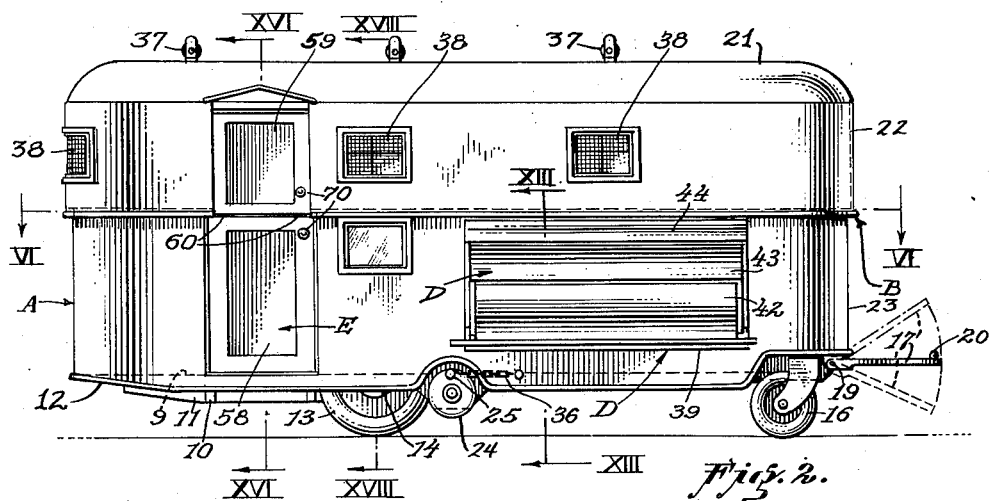
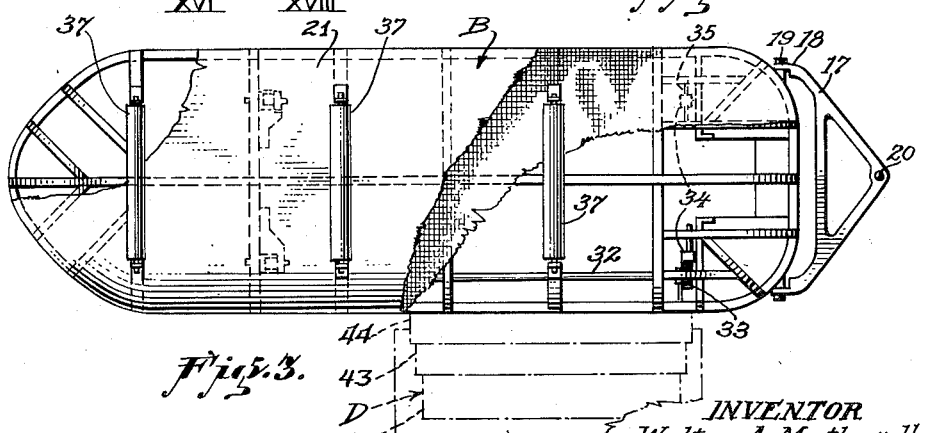
INVENTOR
Walter A. Metherell
BY Munn, Liddy & Daccum
ATTORNEYS.

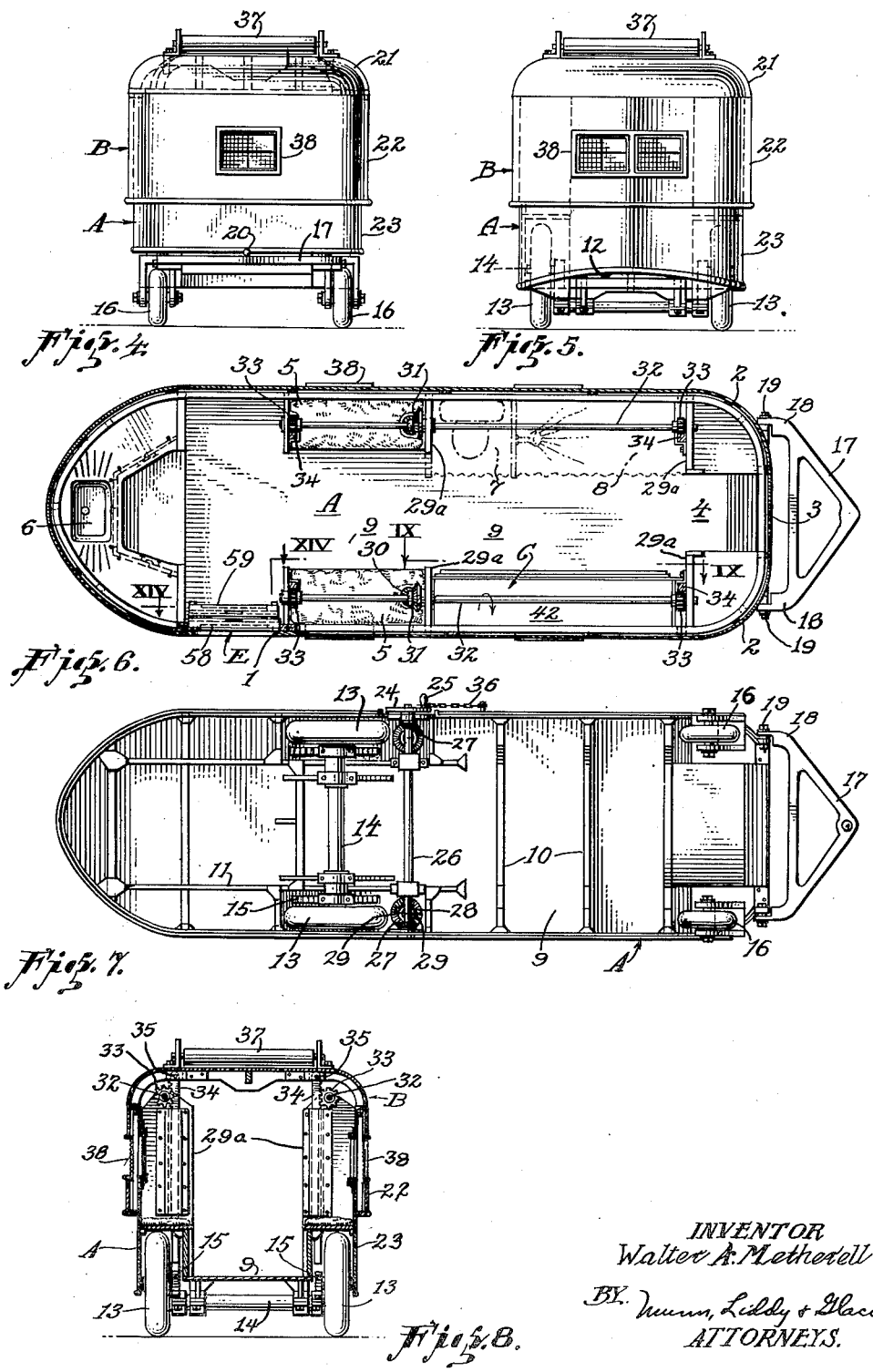

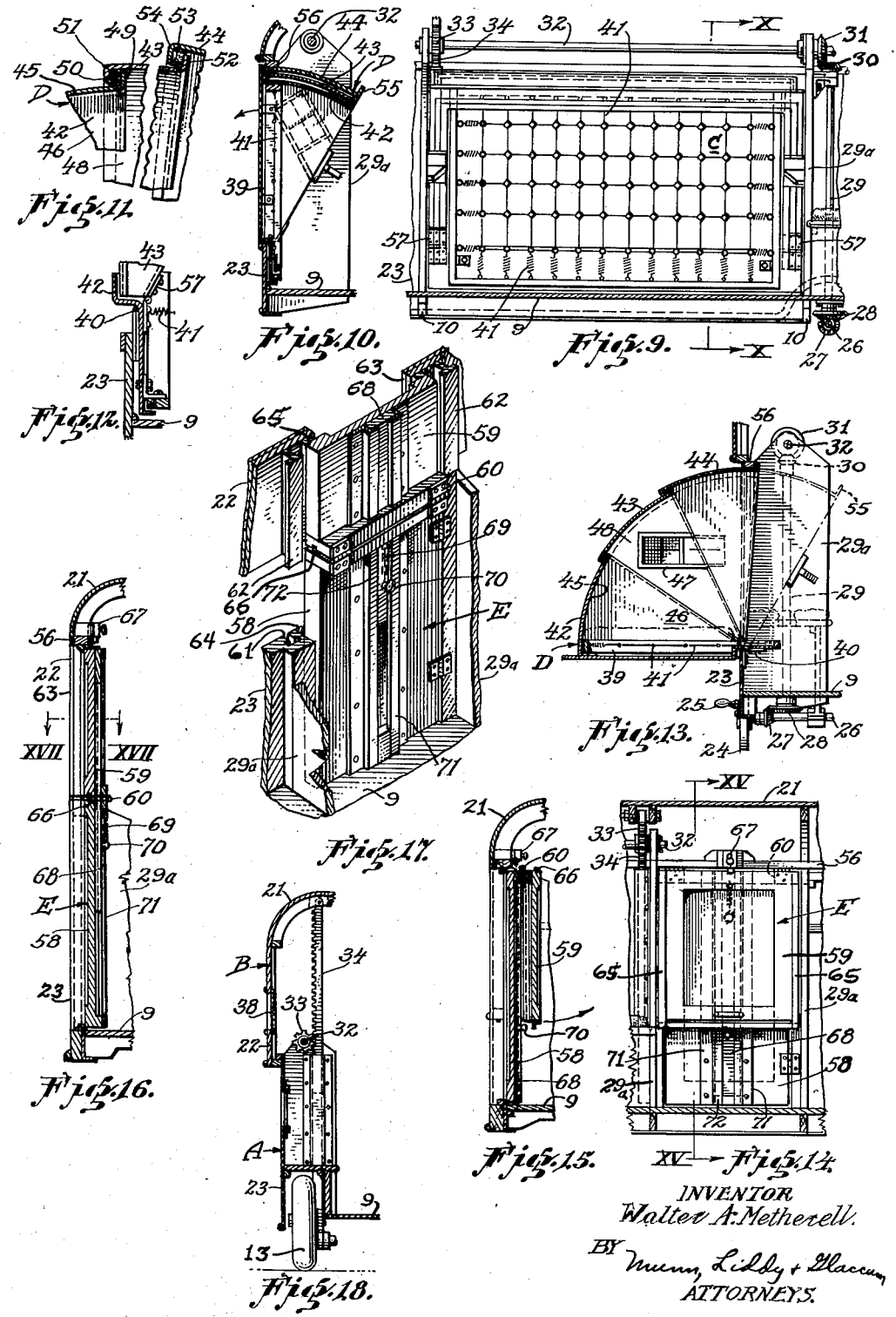

Patented Oct. 2, 1951

2,569,641

UNITED STATES PATENT OFFICE 2,569,641

TRAILER HOUSE

Walter A. Metherell, Turlock, Calif.

Application December 27, 1945, Serial No. 637,356

2 Claims. (Cl. 296—23)

An object of my invention is to provide a trailer house in which the forward end is supported by caster wheels rather than supported by the towing vehicle, such as an automobile. The weight of the forward end of the trailer house is therefore carried by the caster wheels and not by the automobile. The caster wheels permit the free turning of the trailer so that it can readily follow the automobile around curves.

A further object of my invention is to provide a trailer house that has a width substantially the same as the width of the towing automobile and which has novel means for supporting a bed in a closed position where the bed will be confined within the side of the trailer. When the bed is swung into operative position, it will extend outwardly from the side wall of the trailer and practically the entire width of the trailer will be freed from the bed. The advantage of such a construction permits the entire width of the trailer to be used while the bed is in open position. Novel means is provided for covering the bed when open so that the occupant will be protected. The covering means includes telescoping segmental members that permit the bed to be quickly swung into open or closed position and these members are made leak-proof.

A still further object of my invention is to provide a trailer house that when in touring position will take no more head room than the height of the towing automobile. Novel means is used for raising the trailer roof when the device is set up for camping so that full head height will be afforded the occupants. The trailer has an entrance door that is formed in two sections. When the trailer is in touring position, the upper section is swung downwardly into parallel arrangement with the lower section, and the lower section closes the door opening. As soon as the trailer is set up for camping, the upper door section is swung upwardly and is aligned with the lower section so that the door will now extend the full height of the enlarged door opening and will close it.

Other objects and advantages will appear in the following specification, and the novel features of the device will be particularly pointed out in the appended claims.

My invention is illustrated in the accompanying drawings forming a part of this application, in which:

Figure 1 is a side elevation of the trailer shown in touring position with the roof lowered;

Figure 2 is a similar view, but shows the trailer in camping position with the roof raised and the bed in operative position;

Figure 3 is a top plan view of the trailer, portions being broken away to show the roof structure;

Figure 4 is a front end elevation of the trailer;

Figure 5 is a rear end elevation;

Figure 6 is a horizontal section taken along the line VI—VI of Figure 2;

Figure 7 is a bottom plan view of the trailer;

Figure 8 is a vertical section taken along the line VIII—VIII of Figure 1 and shows the mechanism for lifting the roof;

Figure 9 is a vertical longitudinal view taken along the line IX—IX of Figure 6 and shows the bed in closed position;

Figure 10 is a vertical transverse view of the bed and is taken along the line X—X of Figure 9;

Figure 11 is a sectional detail illustrating the telescoping canopy for the bed and showing how the joints are made leak-proof;

Figure 12 illustrates the strap hinges used in connection with the telescoping canopy;

Figure 13 is a view similar to Figure 10, but shows the bed in open position and is taken along the line XIII—XIII of Figure 2;

Figure 14 is a longitudinal section showing the two sections of the door in parallel folded arrangement and is taken along the line XIV—XIV of Figure 6;

Figure 15 is a vertical transverse section taken along the line XV—XV of Figure 14;

Figure 16 is a vertical section taken along the line XVI—XVI of Figure 2, and shows the door in extended position;

Figure 17 is an inner perspective view of the door with the upper section cut along the line XVII—XVII of Figure 16; and Figure 18 is a vertical section taken along the line XVIII—XVIII of Figure 2 and shows the roof in raised position.

While I have shown only the preferred forms of my invention, it should be understood that various changes or modifications may be made within the scope of the appended claims without departing from the spirit and scope of the invention.

In carrying out my invention, I provide a trailer house that has a lower portion indicated generally at A and a vertically movable roof portion indicated generally at B. Figure 6 shows the lower portion A as having a width substantially equal to the width of an automobile, not shown, that is used for pulling the trailer. The lower portion has a door opening 1 and the rear of the portion is made oval in shape so as to give a streamlined effect to the trailer. The front of the lower portion has curved corners 2 merging into a front wall 3. I have shown the lower portion provided with a closet 4 as its front, a bed C along one side wall, seats 5 disposed on both sides and a kitchen sink 6 placed at the rear. If desired a toilet 7 and a shower 8 may be provided. I do not wish to be confined to the particular arrangement of these parts since they form no part of my invention, except the particular construction of the bed.

Figure 7 shows how the floor 9 of the lower portion is supported by cross girders 10 and longitudinally extending members 11. I do not wish to be confined to any particular way for reinforcing the floor. In Figure 1 I illustrate how the rear end of the trailer has its lower portion inclined upwardly at a slight angle as indicated at 12. The floor level 9 is indicated by the dotted lines in this figure. The purpose of the inclined rear portion 12 is to permit the trailer to go over bumps and gulleys without the rear end striking the ground.

The trailer is supported by rear wheels 13, see Figure 7, that are mounted on a common axle 14, the axle in turn being connected to the trailer by any spring suspension desired, such as by leaf springs 15. The wheels may be provided with brakes if desired.

At the forward end of the trailer I provide caster wheels 16. These carry the weight of the forward trailer end and are free to pivot about a vertical axis so that the trailer can follow the course taken by the towing automobile. The connecting member 17, see Figure 7, has its ends 18 pivotally secured to the front of the trailer at 19. A knob 20 or other suitable connecting member is placed at the vertex of the triangular-shaped member 17 and this knob is connectible to the automobile by a trailer hitch, not shown. Figure 2 illustrates how the member 17 can swing vertically about its aligned pivots 19.

Before describing the construction of the bed, it is best to set forth the construction of the roof portion B. This upper portion has a roof 21 and a side wall 22 that envelopes the side wall 23 of the lower portion. The upper roof portion may be raised from the touring position shown in Figure 1 into the camping position shown in Figure 2, and this is accomplished by the mechanism shown in Figures 1, 7, 13 and 18.

In Figure 1 a hand wheel 24 is provided with a handle 25 and the wheel is mounted on a transversely extending shaft 26 that extends under the floor 9 of the lower portion, see Figure 7. The shaft carries bevel gears 27 and these gears mesh with two other bevel gears 28 that are mounted on vertical shafts 29. These shafts extend along the sides of vertical partitions 29a. The partitions are connected to the chassis member and reinforce the side walls of the trailer. Figure 13 shows the top of the shaft 29 carrying a gear 30 and Figure 6 shows the gears 30 meshing with bevel gears 31 that are mounted on two longitudinally extending shafts 32.

Referring to Figure 8, it will be seen that the shafts 32 carry pinions 33 that mesh with vertically extending racks 34, these racks being connected at 35 to the upper roof portion B. A rotation of the hand wheel 24 in the right direction will cause the pinions to lift the racks and to raise the roof portion B from touring position shown in Figure 1, to camping position, shown in Figure 2. In Figure 6, it will be seen that each shaft 32 carries a pinion 33 at each end and that there are four racks, two being disposed on each side so that a uniform lifting effect will be imparted to the upper portion when the hand wheel 24 is rotated. A chain 36, see Figure 7, or any other suitable means, is used for engaging the handle 25 for holding it against return movement after the upper portion B is raised.

If desired, the roof 25 may support transversely extending rollers 37 on its outer surface for supporting a boat or other object. The rollers permit the boat to be moved into place readily. Figure 2 illustrates the upper portion as being provided with windows 38 that may be screened and have removable glass sections so that in case of a storm or cold weather, the glass sections can be moved to cover the openings.

I will now describe the particular construction of the bed and this is shown in detail in Figures 9 to 13, inclusive. In Figure 13, a frame 39 is hinged to the side wall 23 of the lower portion A at 40. The frame 39 may be swung from closed position shown in Figure 10 into full open position shown in Figure 13. The hinge 40 is shown in detail in Figure 12. A mattress supporting spring 41 is carried by the frame and may support a mattress indicated by dotted lines in Figure 13.

A telescoping canopy indicated generally at D for the bed is composed of a plurality of segmental sections 42, 43 and 44. The section 41 is secured to the frame 39 and this section has a cylindrical portion 45 and triangular shaped ends 46. The central section 43 is similar in shape to the section 42 and it has a screened window 47 in its ends 48. Referring to Figure 11, it will be seen that the section 42 has a flange 49 that is designed to bear against a rubber strip 50 that is placed in a channel 51 provided in the section 43. In like manner the section 43 has a flange 52 that bears against a rubber strip 53 that is carried by a channel 54 of the top section 44. Figure 10 shows how the top section 44 has a flange 55 that is designed to bear against a frame piece 56 of the lower trailer portion A when the bed is in open position.

Figure 10 illustrates the three sections in collapsed position with the bed frame 39 occupying a vertical position that parallels the side wall 23 of the lower portion. Figure 13 shows the bed in open position and the telescoping sections of canopy D extend from the frame 39 to the wall and form a complete protecting closure for the bed. When the bed is in folded position, the upper portion B can slide down over it as illustrated in Figure 1. Figure 12 shows how the sections 42, 43 and 44 are hinged to the side wall by strap hinges indicated at 57. If desired, both sides of the trailer may carry a bed of the type just explained.

I will now describe the particular construction of the sectional door and this is shown in Figures 14 to 18, inclusive. Figure 15 shows the two-hinged sections 58 and 59 of the door E in a position where the upper section 59 parallels the lower section 58. It will be seen that the top of the section 59 is hinged at 60 to the section 58. Figure 17 illustrates how the wall 23 has a vertical T-shaped slot 61 therein and how the upper section wall 22 has a T-shaped projection 62 that rides in the slot. Both sides of the door opening 1 are provided with the vertical slots 61 and it will be seen that the wall 22 has a door opening 63 that is of less width than the opening 1. The door has its lower section 58 extending between the sides of the door opening 1 and the door bears against stops 64 when closed. The upper door section 59 carries stops 65 that bear against the upper wall 22 adjacent to the door opening 63 in the upper wall.

In Figure 16 the two door sections 58 and 59 are shown in superimposed relation and a rubber strip 66 is placed between the sections to make the door water-proof. A latch 67 is used for keeping the door in closed position. A bar 68 carried by the lower door section may be moved upwardly to hold the upper door section against accidental swinging about its hinge 60. Figure 17 illustrates how the sliding bar 68 can be held in raised position by connecting a chain 69 to the knob 70 on the sliding bar. The bar slides in guide channels 71 in the lower section 58 and is receivable in the guide channels 72 in the upper section.

While the trailer is in touring position, the upper door section 59 is folded down upon the lower one and the lower door section is of a size to close the door opening 1. When the trailer is used for camping, the upper portion B is raised and the upper door section 59 is swung into its superimposed position. The door has now its full height and will close the larger door opening. The increased height of the door opening permits a person to enter or leave the trailer without stooping.

When the trailer is in a touring position, it will occupy no more head room and will be no wider than the automobile that pulls it. The weight of the forward end of the trailer is supported by the caster wheels 16. When the trailer is in camping position, the upper roof portion may be raised and secured in raised position and then the bed may be swung into open position. The bed when open takes up very little floor space of the trailer. The door is also enlarged to fill the increased height of the door opening when the door is closed. The full width of the trailer can be used even though the bed is in open position.

I claim:

1. In a trailer house having a floor: a wall having a bed-receiving opening therein with its lower edge spaced above the floor; a bed-supporting frame dimensioned to close the opening; the frame being hinged at one of its sides to the wall at the bottom of the opening; the frame being swingable from a substantially upright folded position closing the opening into an extended horizontal position projecting outwardly beyond the exterior surface of the wall; a sectional canopy extending from the frame and over a bed, carried by the frame to the wall when the frame is extended; the canopy being foldable into the interior of the trailer house when the frame occupies a folded position; the sections of the canopy being rigid and telescoping one within the other; the canopy, when opened, having its lower section secured to the frame to support the latter, and the uppermost section having a flange abuttable against a portion of the wall to limit outwardly swinging of that section; and coacting means on adjacent sections to limit their outward telescoping movement to a point where the rigid sections will constitute a support for the outer side of the bed frame when the latter is disposed horizontally.

2. In a trailer house; a lower enclosure having a lower wall with a bed-receiving opening therein; a bed-carrying frame hinged to the lower wall and being swingable from a substantially upright position closing the opening into an extended horizontal position projecting outwardly beyond the exterior surface of the lower wall; a sectional canopy extending from the frame and over a bed, carried by the frame, to the lower wall when the frame is extended; the canopy including telescoping sections movable into the interior of the lower enclosure when the frame occupies a folded position; a vertically-movable upper cover portion having an upper wall slidably telescoping over the exterior of the lower wall; and means for moving the upper cover portion and the upper wall downwardly into a position to cause the upper wall to provide a closure over the bed-receiving opening, the bed carrying frame and the canopy when the bed-carrying frame is folded.

WALTER A. METHERELL.

REFERENCES CITED

The following references are of record in the file of this patent:

UNITED STATES PATENTS

| Number | Name | Date |
|---|---|---|
| 1,318,994 | Hancock | Oct. 14, 1919 |
| 1,436,984 | Follett | Nov. 28, 1922 |
| 1,715,221 | Carpenter et al. | May 28, 1929 |
| 1,998,937 | McGinnis | Apr. 23, 1935 |
| 2,001,619 | Levoyer | May 14, 1935 |
| 2,104,648 | Hickey | Jan. 4, 1938 |
| 2,202,747 | Roloson | May 28, 1940 |
| 2,247,128 | Levey | June 24, 1941 |
| 2,323,106 | Whiteman | June 29, 1943 |
| 2,325,762 | Ford | Aug. 3, 1943 |
| 2,343,261 | Marple | Mar. 7, 1944 |
| 2,379,170 | McDaniel | June 26, 1945 |
| 2,384,659 | Wait | Sept. 11, 1945 |
| 2,404,121 | Black | July 16, 1946 |

FOREIGN PATENTS

| Number | Country | Date |
|---|---|---|
| 446,028 | Great Britain | Apr. 23, 1936 |
| 448,048 | Great Britain | June 2, 1936 |
| 485,330 | Great Britain | May 18, 1938 |
| 678,703 | France | Jan. 2, 1930 |
| 811,585 | France | Jan. 18, 1937 |